US009681117B2

(12) United States Patent
Suh et al.

(10) Patent No.: US 9,681,117 B2
(45) Date of Patent: Jun. 13, 2017

(54) RECEIVER APPARATUS AND METHOD FOR RECEIVING A THREE-DIMENSIONAL BROADCAST SIGNAL IN A MOBILE ENVIRONMENT

(75) Inventors: Jongyeul Suh, Seoul (KR); Gomer Thomas, Arlington, WA (US); Joonhui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 256 days.

(21) Appl. No.: 13/881,572

(22) PCT Filed: Oct. 28, 2011

(86) PCT No.: PCT/KR2011/008125
§ 371 (c)(1),
(2), (4) Date: Apr. 25, 2013

(87) PCT Pub. No.: WO2012/057564
PCT Pub. Date: May 3, 2012

(65) Prior Publication Data
US 2013/0222541 A1    Aug. 29, 2013

Related U.S. Application Data

(60) Provisional application No. 61/407,452, filed on Oct. 28, 2010.

(51) Int. Cl.
*H04N 15/00* (2006.01)
*H04N 13/00* (2006.01)
(Continued)

(52) U.S. Cl.
CPC ..... *H04N 13/0059* (2013.01); *H04N 13/0029* (2013.01); *H04N 13/0048* (2013.01);
(Continued)

(58) Field of Classification Search
CPC .......... H04N 21/4345; H04N 13/0059; H04N 13/0062; H04N 13/0048; H04N 13/0003;
(Continued)

(56) References Cited

U.S. PATENT DOCUMENTS 6,785,903 B1 *  8/2004  Kuh ................................ 725/50
7,650,036 B2 *  1/2010  Lei et al. ...................... 382/232
(Continued)

FOREIGN PATENT DOCUMENTS

CN    101656890 A    2/2010
CN    101785302 A    7/2010
(Continued)

*Primary Examiner* — Michael Lee
(74) *Attorney, Agent, or Firm* — Dentons US LLP (57) ABSTRACT

The invention relates to a method and apparatus for receiving a three-dimensional broadcast image in a mobile environment. The method for receiving a three-dimensional broadcast image according to one embodiment of the present invention comprises the following steps: receiving a broadcast signal including a left-view image and aright-view image for a three-dimensional broadcast image, and a service signaling channel for signaling the three-dimensional broadcast image; parsing a service map table (SMT) contained in the service signaling channel, parsing, from the parsed SMT, component-type information for indicating whether or not a three-dimensional video stream including the left-view image and the right-view image is contained in the broadcast signal, and parsing, from the SMT, left/right-view image information for indicating whether the left-view image or right-view image is transmitted through a specific region of a single video frame, if the component-type information indicates that the three-dimensional video stream containing the left-view image and the right-view image is contained in the broadcast signal; formatting the left-view image and the right-view image into a three-
(Continued)

dimensional image on the basis of the parsed left/right-view image information; and displaying the three-dimensional image.

8 Claims, 7 Drawing Sheets

(51) Int. Cl.
    *H04N 21/434*     (2011.01)
    *H04N 21/4402*     (2011.01)
    *H04N 21/81*     (2011.01)
    *H04N 21/84*     (2011.01)

(52) U.S. Cl.
    CPC ..... *H04N 13/0066* (2013.01); *H04N 21/4345* (2013.01); *H04N 21/4402* (2013.01); *H04N 21/816* (2013.01); *H04N 21/84* (2013.01)

(58) Field of Classification Search
    CPC .. H04N 21/816; H04N 9/8042; H04N 9/8227; H04N 13/0066; H04N 13/0029; H04N 21/4402; H04N 21/84
    USPC .......................................................... 348/43
    See application file for complete search history.

(56) References Cited

U.S. PATENT DOCUMENTS

| | | | |
|---|---|---|---|
| 8,451,320 B1* | 5/2013 | Cole et al. ....................... 348/43 |
| 2005/0147309 A1* | 7/2005 | Katata ..................... H03M 7/30 382/239 |
| 2007/0171276 A1* | 7/2007 | Kim ................... H04N 13/0033 348/51 |
| 2008/0049874 A1* | 2/2008 | Choi ..................... H03M 13/27 375/321 |
| 2008/0247462 A1* | 10/2008 | Demos ................. H04N 19/597 375/240.03 |
| 2010/0046635 A1* | 2/2010 | Pandit et al. ............ 375/240.25 |
| 2010/0141738 A1* | 6/2010 | Lee ........................ H04H 20/57 348/43 |
| 2010/0277568 A1* | 11/2010 | Yun et al. ........................ 348/43 |
| 2011/0286530 A1* | 11/2011 | Tian et al. ............... 375/240.25 |
| 2011/0310978 A1* | 12/2011 | Wu et al. .................. 375/240.25 |
| 2012/0038641 A1* | 2/2012 | Levantovsky ........ G06T 7/0075 345/424 |

FOREIGN PATENT DOCUMENTS

| | | |
|---|---|---|
| KR | 10-2007-0058302 | 6/2007 |
| KR | 10-2009-0079859 | 7/2009 |
| KR | 10-2009-0102116 | 9/2009 |
| KR | 10-2010-0050426 | 5/2010 |
| WO | 2007064159 A1 | 6/2007 |

* cited by examiner

| Syntax | No. of Bits | Format |
|---|---|---|
| MH_component_data ( ) | | |
| { | | |
| 3D_structure | 8 | uimsbf |
| LR_first | 1 | bslbf |
| 3D_orientation | 2 | uimsbf |
| Reserved | 5 | bslbf |
| profile_idc | 8 | uimsbf |
| constraint_set0_flag | 1 | bslbf |
| constraint_set1_flag | 1 | bslbf |
| constraint_set2_flag | 1 | bslbf |
| AVC_compatible_flags | 5 | bslbf |
| level_idc | 8 | uimsbf |
| AVC_still_present | 1 | bslbf |
| AVC_24_hour_picture_flag | 1 | bslbf |
| reserved | 6 | '111111' |
| } | | |

Fig. 5

| 3D_orientation | Meaning |
|---|---|
| 00 | Left – , Right – |
| 01 | Left – , Right – Inverted |
| 10 | Left – Inverted, Right – |
| 11 | Left – Inverted, Right - Inverted |

RECEIVER APPARATUS AND METHOD FOR RECEIVING A THREE-DIMENSIONAL BROADCAST SIGNAL IN A MOBILE ENVIRONMENT

This application is a 35 USC §371 National Stage entry of International Application No. PCT/KR2011/008125 filed on Oct. 28, 2011, and claims priority of Provisional Application No. 61/407,452 filed on Oct. 28, 2010, all of which are incorporated by reference in their entirety herein.

TECHNICAL FIELD

The present invention relates to a method of receiving a 3D (3-dimensional) broadcast signal and apparatus thereof.

More particularly, the present invention related to a method of receiving the 3D broadcast signal and apparatus thereof in a mobile broadcasting reception environment.

BACKGROUND ART

As the dissemination of a 3 dimensional television (3DTV) is raging, a transmission of a 3D video content performed by a digital broadcasting as well as the dissemination of the 3D video content performed by a storing media is vitalized.

In general, a 3 dimensional video provides a 3D effect using a principle of stereo vision of two eyes. Since a human feels perspective via parallax of two eyes, in other word, binocular parallax due to a space between two eyes apart from each other about 65 mm, the 3D video may provide the 3D effect and the perspective in a manner of providing a video, which makes a left eye and a right eye see a related plane video, respectively.

The 3D video display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables to recognize a 3D video effect in a manner of making the left eye and the right eye watch the left view image and the right view image respectively using a polarized glasses or a display device itself.

Meanwhile, a broadcast service in a mobile environment is currently provided to accommodate a viewer. However, the broadcast service in the mobile environment has not reached its territory to a 3D broadcast video yet.

DISCLOSURE OF THE INVENTION

Technical Task

A technical task that the present invention intends to achieve is to receive a 3D broadcast video in a mobile broadcasting reception environment as well.

A different technical task that the present invention intends to achieve is to receive a 3D broadcast video in a mobile broadcasting reception environment while maintaining a backward compatibility with a conventional fixed broadcasting environment.

Technical Solution

To achieve the aforementioned technical tasks and in accordance with the purpose of the present invention, as embodied and broadly described, according to one embodiment of the present invention a method of receiving a 3D broadcast video includes the steps of receiving a broadcast signal including a left video and a right video for the 3D broadcast video and a service signaling channel to signal the 3D broadcast video, parsing a service map table (SMT) included in the service signaling channel, parsing a component type information indicating whether the broadcast signal includes a 3D video stream including the left and the right video in the parsed SMT, and if the component type information indicates that the broadcast signal includes the 3D video stream including the left and the right video, parsing a left/right video image information indicating whether a left video image configuring the left video or a right video image configuring the right video is transmitted via a specific region of a video frame in the SMT, formatting the left video image and the right video image to a 3D video image according to the parsed left/right video image, and displaying the 3D video image.

Preferably, the method of receiving a 3D broadcast video according to one embodiment of the present invention may further include the step of further parsing a 3D image direction information indicating whether at least one of the left video image and the right video image is transmitted in a manner of upside down in the video frame.

Preferably, the method of receiving a 3D broadcast video according to one embodiment of the present invention may further include the steps of detecting a location of a known data sequence included in the received broadcast signal and performing a channel equalization on a channel on which the broadcast signal is transmitted by detecting the known data sequence included in the broadcast signal with the location of the detected known data sequence.

Preferably, the method of receiving a 3D broadcast video according to one embodiment of the present invention may further include the step of performing a trellis decoding for a data included in a broadcast signal received after the channel equalization is performed.

Preferably, the method of receiving a 3D broadcast video according to one embodiment of the present invention may further include the step of performing an error correction decoding for the trellis decoded data in a Reed-Solomon (RS) frame unit.

And, a mobile broadcasting receiver receiving a 3D broadcast video may include a device configured to perform the aforementioned method.

Advantageous Effects

According to the present invention, a 3D broadcast video can be efficiently received in a mobile broadcasting reception environment as well.

According to the present invention, a 3D broadcast video can be efficiently received in a mobile broadcasting reception environment while a backward compatibility is maintained with a conventional fixed broadcasting environment.

BEST MODE

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expression for a 3 dimensional video may include a stereoscopic technique considering two viewpoints and a multiple view image technique (or a multi-view technique) considering more than 3 viewpoints. Comparably, a conventional single view image technique may be called a monoscopic video technique.

The stereoscopic technique uses a pair of image, i.e., a left view image and a right view image obtained by photographing a same subject with a left camera and a right camera, which are away a certain distance from each other. The multi-view technique uses more than 3 images obtained by photographing with 3 or more cameras having a certain distance and angle. In the following description, although the present invention explains the stereoscopic technique as one embodiment, the idea of the present invention may also be applied to the multi-view technique.

According to the present invention, the stereoscopic technique includes a side-by-side, a top-bottom, a checker board technique, and the like. The side-by-side technique is a technique configuring one stereoscopic video by performing a half down sampling horizontally on each of a left video and a right video, respectively and situating one sampled video in a left region and the other sampled video in a right region. The top-bottom technique is a technique configuring one stereoscopic video by performing a half down sampling vertically on each of a left video and a right video, respectively and situating one sampled video in a top region and the other sampled video in a bottom region. The checker board technique is a technique configuring one video by performing a half down sampling in a manner that a left video and a right video respectively intersect horizontally and vertically. Yet, the stereoscopic technique according to the present invention may be non-limited or non-restricted by the aforementioned example.

When a 3D video is intended to be transmitted, one of the considerations is compatibility with a 2 dimensional video. Because a receiver not supportive of a 3D video display should display a 3D video, which is included in a received broadcasting signal, as a 2D video and a 3DTV should be able to display a 2D video as well, if necessary.

Figure 1:
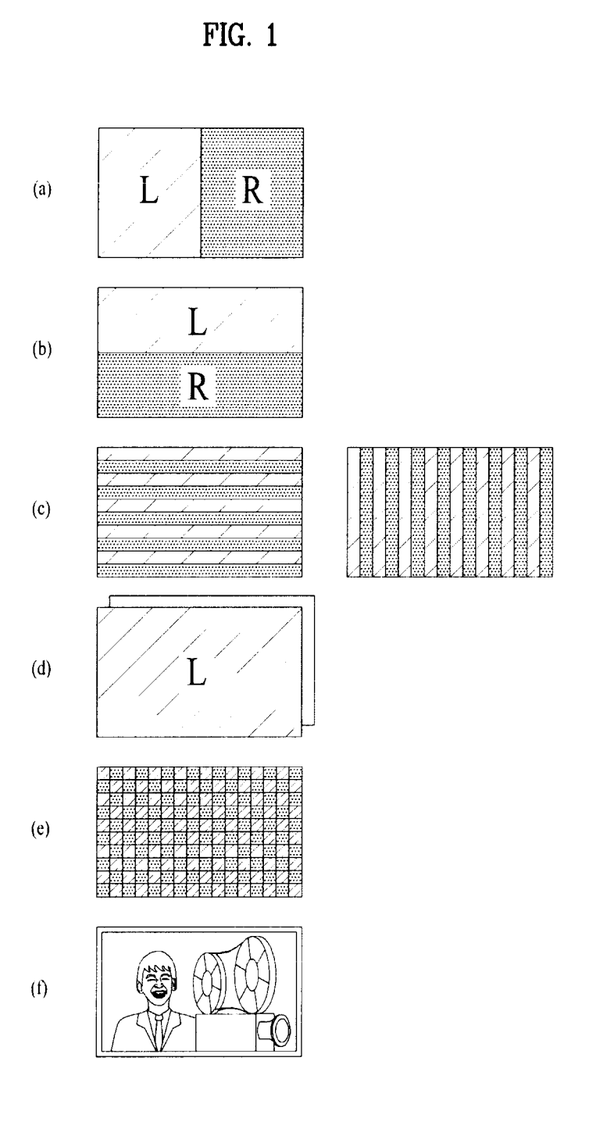
FIG. 1 is a diagram of a stereoscopic image multiplexing format of a video stream format according to one embodiment of the present invention.

FIG. 1 is a diagram of a stereoscopic image multiplexing format of a video stream format according to one embodiment of the present invention.

A single video stream format includes (a) a side-by-side format, (b) a top-bottom format, (c) an interlaced format, (d) a frame sequential format, (e) a checker board format, (f) an anaglyph format, and the like.

(a) The side-by-side format is a format configuring one stereoscopic video by performing a half down sampling horizontally on each of a left video and a right video, respectively and situating one sampled video in a left region and the other sampled video in a right region. (b) The top-bottom technique is a format configuring one stereoscopic video by performing a half down sampling vertically on each of a left video and a right video, respectively and situating one sampled video in a top region and the other sampled video in a bottom region. (c) The interlaced technique is a format configuring one video by performing a half down sampling in order for a left video and a right video to intersect horizontally on every line or a format configuring one video by performing a half down sampling in order for a left video and a right video to intersect vertically on every line. (d) The frame sequential technique is a format configuring one video stream by intersecting a left video and a right video in a time manner. (e) The checker board format is a format configuring one video by performing a half down sampling in order for a left video and a right video to intersect horizontally and vertically, respectively. (f) The anaglyph format is a format configuring one video to create a 3D effect using a complementary contrast.

In order for a receiving system to process a video data in a manner of efficiently demultiplexing the video data transmitted by the aforementioned various techniques, it is necessary to transmit information on the aforementioned multiplexing format.

In FIG. 1, in case of transmitting a video data in a manner of the side-by-side or the top-bottom technique, since it corresponds to the techniques transmitting two videos of half down sampling, resolution of each video may be halved. Yet, capacity of video data in case of transmitting two videos of half resolution may become greater than the capacity of video data in case of transmitting one video of full resolution. For instance, in case that a video data is coded to indicate a change and difference between a reference video and the video data, video compressibility rate may increase. If the video compressibility rate for the two video data of half resolution decreases compared to the video compressibility rate for one video data of full resolution, the capacity of two video data of half resolution may be greater than the capacity of one video data of full resolution. Hence, a transmitting system may be able to transmit one of the two videos in a manner of inverting it top and down or minoring it side to side to enhance similarity of adjacent image to increase the compressibility rate. This image inverting or mirroring can be named as an image flipping in the following description.

Figure 2:
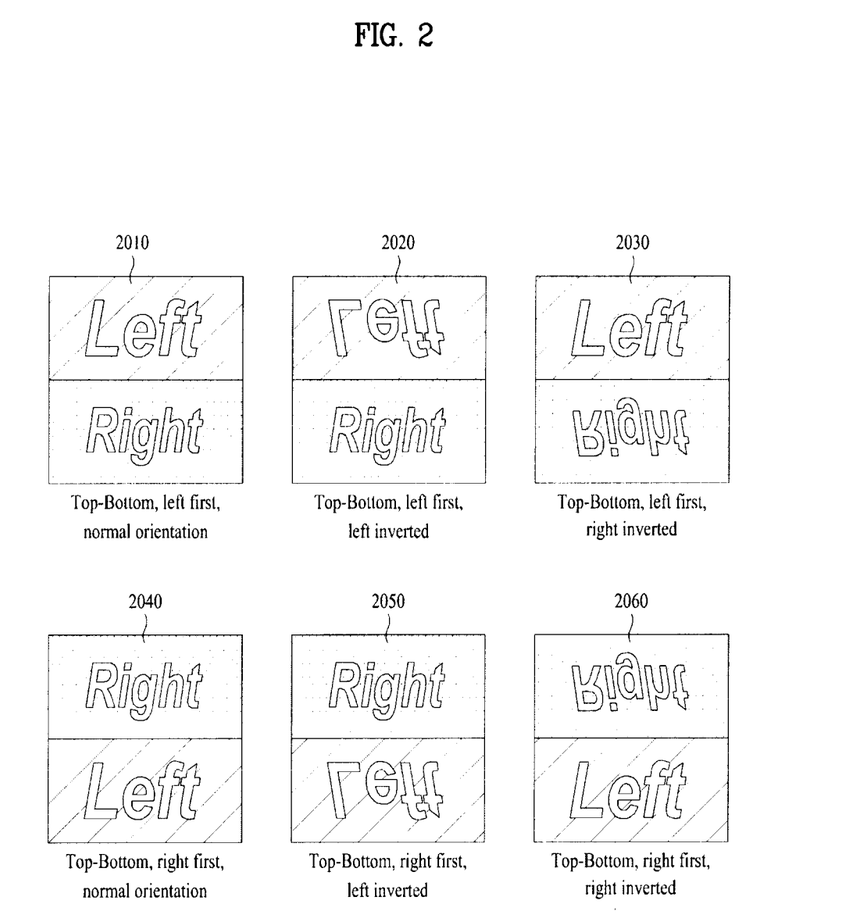
FIG. 2 is a diagram of a method of configuring an image in case that a stereoscopic image is multiplexed by a top-bottom technique according to one embodiment of the present invention.

FIG. 2 is a diagram of a method of configuring an image in case that a stereoscopic image is multiplexed by a top-bottom technique according to one embodiment of the present invention.

Images 2010 to 2030 configure an image by positioning a left image on the top and a right image in the bottom. Images 2040 to 2060 configure an image by positioning a left image in the bottom and a right image on the top.

A left image and a right image are normally configured in an image 2010. An image 2020 indicates a configuration that a left image on the top is inverted. An image 2030 indicates a configuration that a right image in the bottom is inverted. A right image and a left image are normally configured in an image 2040. An image 2050 indicates a configuration that a left image in the bottom is inverted. An image 2060 indicates a configuration that a right image on the top is inverted.

Figure 3:
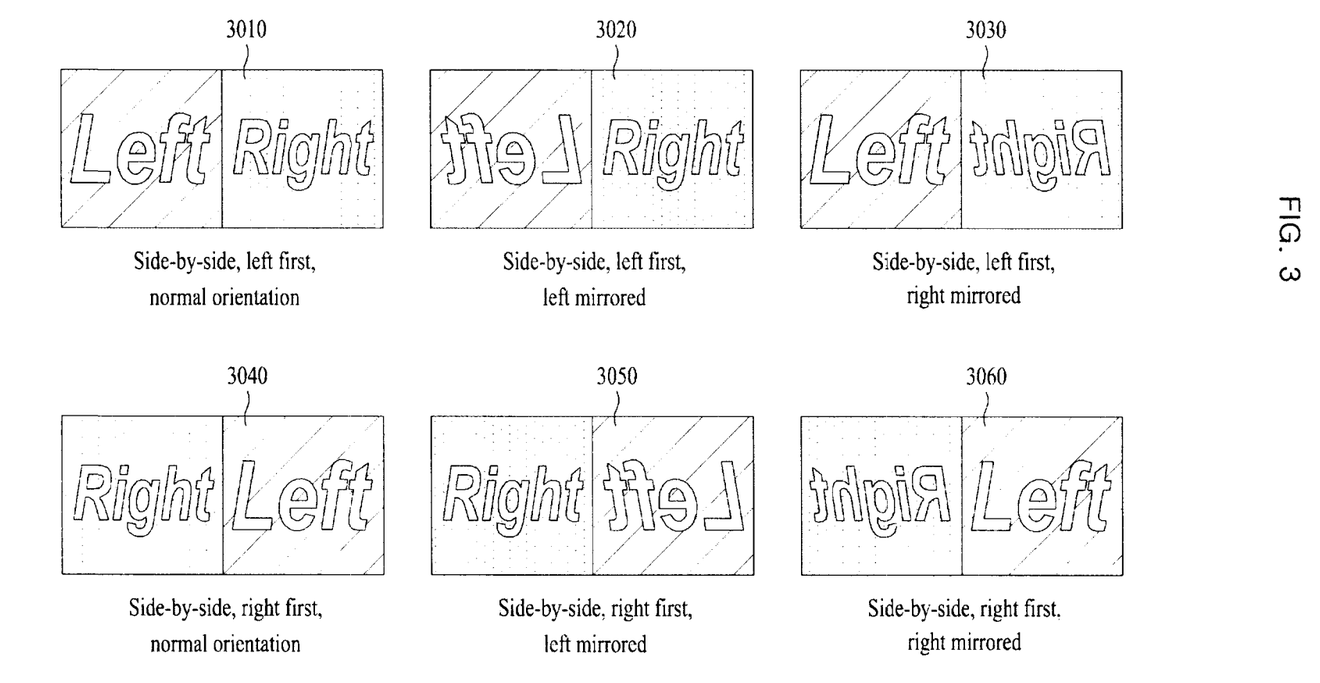
FIG. 3 is a diagram of a method of configuring an image in case that a stereoscopic image is multiplexed by a side-by-side technique according to one embodiment of the present invention.

FIG. 3 is a diagram of a method of configuring an image in case that a stereoscopic image is multiplexed by a side-by-side technique according to one embodiment of the present invention.

Images 3010 to 3030 configure an image by positioning a left image in the left and a right image in the right. Images 3040 to 3060 configure an image by positioning a left image in the right and a right image in the left.

A left image and a right image are normally configured in an image 3010. An image 3020 indicates a configuration that a left image in the left is mirrored. An image 3030 indicates a configuration that a right image in the right is mirrored. A right image and a left image are normally configured in an image 3040. An image 3050 indicates a configuration that a left image in the right is mirrored. An image 3060 indicates a configuration that a right image in the left is mirrored.

The inverting and mirroring an image in FIG. 2 and FIG. 3 may bring about a difference of data compressibility rate. For instance, assume a case that one screen is compressed using a data difference between a boundary pixel and a reference pixel. Since a pair of stereoscopic images corresponds to a pair of images creating a 3D effect for a basically identical screen, it is highly probable that the information according to a position of the screen is similar. In particular, totally new image information is connected in a part to which a left image and a right image are connected and difference values to be compressed may change considerably in the normally arranged images 2010/2040/3010/3040. Yet, in case of the inverted images 2020/2030/2050/2060, since a bottom part of the left image and the bottom part of the right image 2030/2050 or a top part of the left image and the top part of the right image 2020/2060 are connected to each other, data quantity to be coded in the part to which the left image and the right image are connected may decrease. In case of the mirrored images 3020/3030/3050/3060, since a right side of the left image and the right side of the right image 3030/3050 or a left side of the left image and the left side of the right image 3020/3060 are connected to each other, the data quantity to be coded in the part to which the left image and the right image are connected may decrease since the similarity of data is continued.

In order for the receiving system to efficiently receive and process a 3D video stream or a 3D video data, it is necessary to transmit information on the aforementioned multiplexing format. Moreover, in case that an image is inverted or mirrored as mentioned in the above, it is necessary to transmit the information related to the inverting or mirroring. For clarity, the information can be defined as a table or a descriptor.

Figure 4:
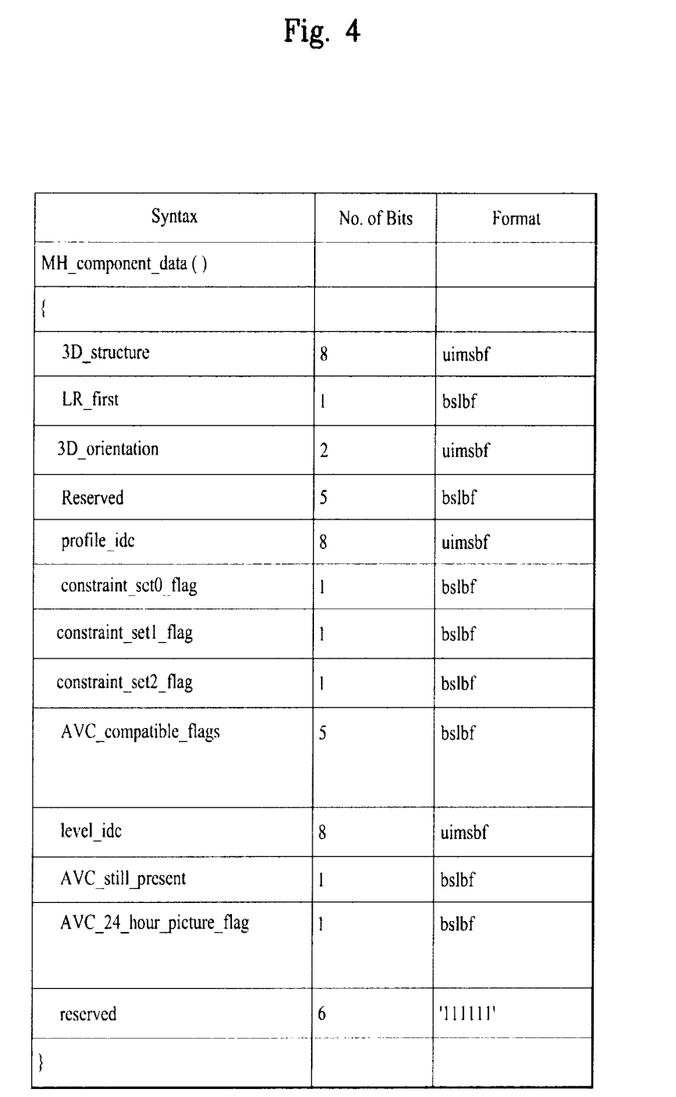
FIG. 4 is a table indicating a syntax of MH_component_data for a stereoscopic video according to one embodiment of the present invention.

FIG. 4 is a table indicating a syntax of MH_component_data for a stereoscopic video according to one embodiment of the present invention.

The MH_component_data according to one embodiment of the present invention may be able to include a 3D_structure field, an LR_first field, a 3D_orientation field, a profile_idc field, a constraint_set0_flag field, a constraint_set1_flag field, a constraint_set2_flag field, an AVC_compatible_flags field, a level_idc field, an AVC_still_ present field and/or an AVC_24_hour_picture_flag field.

The 3D_structure field indicates a structure of a stereoscopic image. For instance, the 3D_structure field may be able to include the information on whether the stereoscopic image is configured by a half resolution or a full resolution. Or, in case of the half resolution, a multiplexing technique of a left image and a right image can be indicated by this field. In particular, the 3D_structure field may be able to include the information indicating which technique is used among the multiplexing techniques depicted in FIG. 1.

The LR_first field, for instance, in case of a side-by-side format, indicates whether a left half image is a left image or a right image. As a different example, in case of a top-bottom format, this field indicates whether a top half image is a left image or a right image. For instance, in case of the side-by-side format, if the 3D_structure field is set to '0', this field indicates that the left half image is the left image. If the 3D_structure field is set to '1', this field indicates that the left half image is the right image.

The 3D_orientation field includes information indicating whether a left image or a right image is inverted in a multiplexing structure of a stereoscopic image.

The profile_idc field indicates a profile information followed by a coded video sequence.

The constraint_set0_flag field indicates whether a $1^{st}$ constraint on a video sequence coding is applied to a corresponding video sequence coding.

The constraint_set1_flag field indicates whether a $2^{nd}$ constraint on a video sequence coding is applied to a corresponding video sequence coding.

The constraint_set2_flag field indicates whether a $3^{rd}$ constraint on a video sequence coding is applied to a corresponding video sequence coding.

The AVC_compatible_flags field indicates whether a video sequence coding is compatible.

The level_idc field indicates a level information followed by a coded video sequence.

The AVC_still_present field corresponds to an information indicating a use of an AVC picture.

According to one embodiment of the present invention, whether a 3D service is included in an MH service can be signaled via a MH_service_category field of a service map table. In this case, a receiver not capable of receiving and processing the 3D service is configured not to recognize this value or is configured to ignore the value, thereby securing a backward compatibility with a legacy receiver even in case that the 3D service is provided.

Or, the 3D service can be signaled via an MH component descriptor. For instance, whether a specific component includes the 3D service can be indicated via a component_type included in the MH component descriptor. A receiver may be able to recognize whether the specific component includes the 3D service via a configuration value of the component_type.

Meanwhile, as mentioned in the foregoing description, a technique for a 3D stereoscopic video can be performed via the MH_component_data.

According to a different embodiment of the present invention, a mobile broadcasting receiver distinguishes whether a mobile broadcast service received using a MH_service_category of the SMT is a 3D broadcast service. This process is optional. As a further different embodiment, the 3D broadcast service can be identified using a service_category value indicating a conventional mobile digital broadcasting.

The mobile broadcasting receiver identifies whether a 3D video component is included in a corresponding service using a component_type value of the MH component descriptor. A legacy broadcasting receiver (i.e., a legacy mobile receiver) may be able to filter the 3D broadcast service using the component_type field.

The mobile broadcasting receiver identifies 3D format information of a 3D video component and the like in advance using a detail field of the MH_component_data. In some cases, if a format not supported by the receiver is included, a corresponding service can be filtered out.

The mobile broadcasting receiver receives a decoded image signal and then formats a video signal according to a pixel arrangement of a 3D display again, in other word, performs a process of mapping a pixel again. In this case, the 3D format information of a video can use the information included in the aforementioned MH_component_data.

Figure 5:
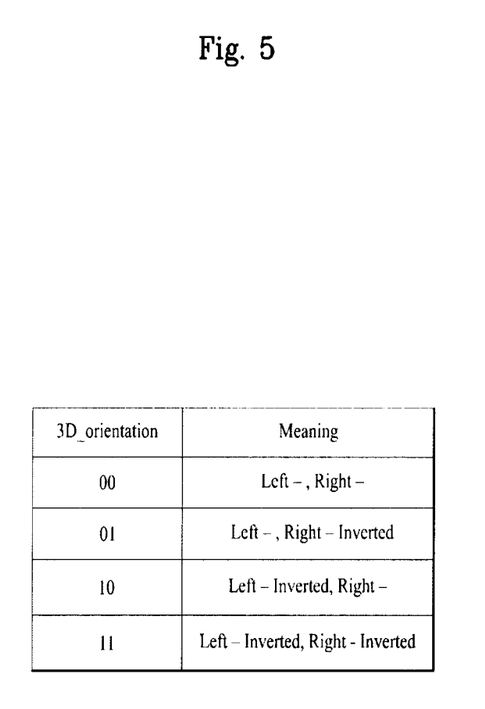
FIG. 5 is a table explaining each configuring value of a 3D_orientation field according to one embodiment of the present invention.

FIG. 5 is a table for explaining each configuring value of a 3D_orientation field according to one embodiment of the present invention.

According to one embodiment of the present invention, if the 3D-orientation field is set to '00', it indicates that both a left image and a right image are not inverted.

If the 3D-orientation field is set to '01', it indicates that a left image is not inverted and a right image is inverted.

If the 3D-orientation field is set to '10', it indicates that a right image is not inverted and a left image is inverted.

If the 3D-orientation field is set to '11', it indicates that both a left image and a right image are inverted.

Figure 6:
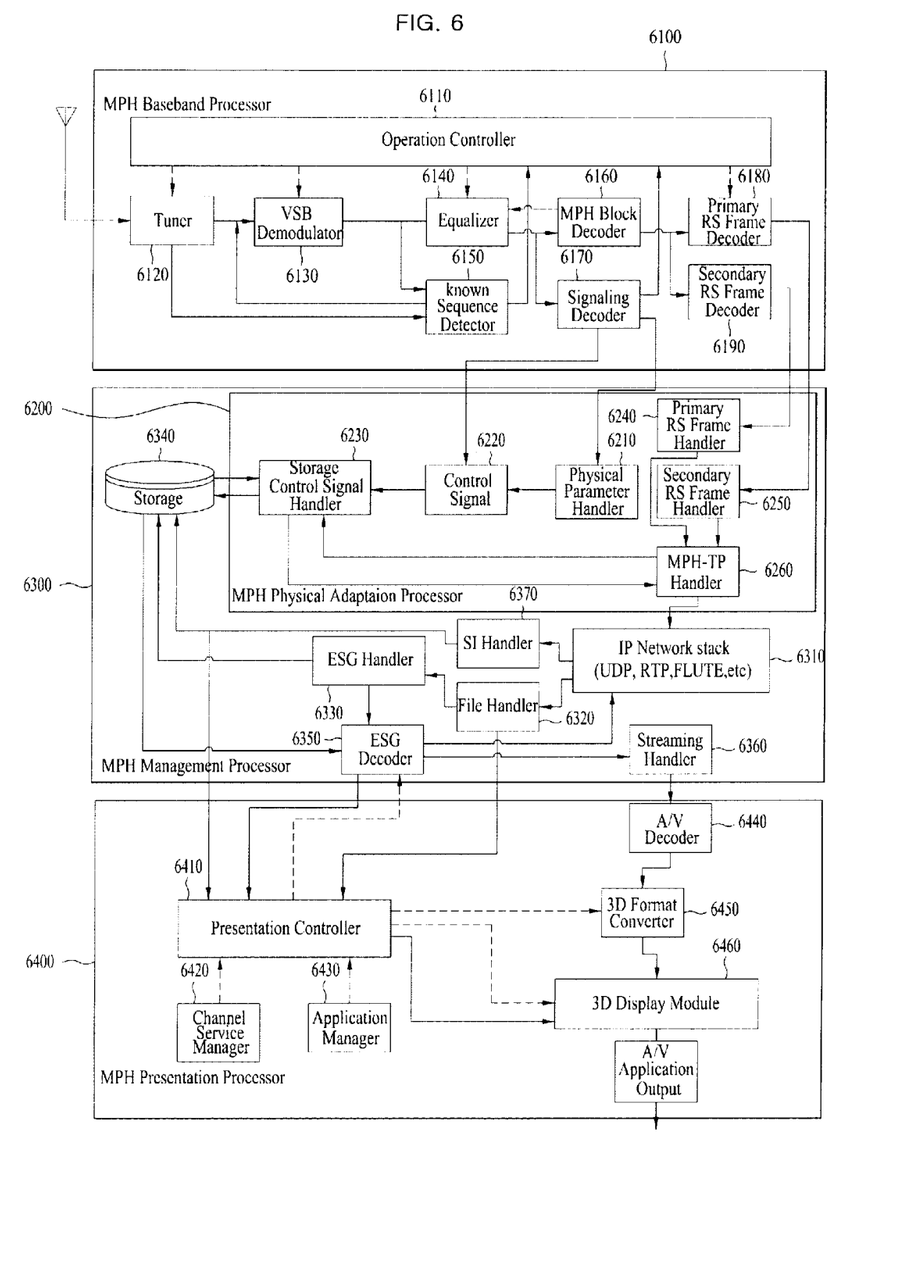
FIG. 6 is a diagram of a mobile broadcasting receiver according to one embodiment of the present invention.

FIG. 6 is a diagram of a mobile broadcasting receiver according to one embodiment of the present invention.

The mobile broadcasting receiver according to one embodiment of the present invention includes a baseband processor 6100, a physical adaptation processor 6200, a management processor 6300 and/or a presentation processor 6400.

The baseband processor 6100 may be able to include an operation controller 6110, a tuner 6120, a VSB demodulator 6130, an equalizer 6140, a known data sequence detector 6150, a block decoder 6160, a signaling decoder 6170, a primary RS frame decoder 6180, and/or a secondary RS frame decoder 6190.

The operation controller 6110 is configured to control an operation of a baseband module of the mobile broadcasting receiver. In particular, the operation controller is configured to play a role in controlling each unit of the baseband processor.

The tuner 6120 is configured to play a role in tuning a receiver with a frequency of a specific physical channel. The tuner 6120 may be able to output the frequency tuned with the specific physical channel to the VSB demodulator 6130 and/or the known data sequence detector 6150 in a manner of downconverting into an intermediate frequency (IF) signal.

The VSB demodulator 6130 is configured to make a base band signal in a manner of performing an automatic gain control, carrier wave recovery, timing recovery, and the like for a digital IF signal of an inputted pass band and may be then able to output the base band signal to the equalizer 6140 and the known data sequence detector 6150. The corresponding VSB demodulator 6130 may be able to enhance demodulation performance by using a known data symbol sequence inputted from the known data sequence detector 6150 in case of performing the timing recovery or the carrier wave recovery.

The equalizer 6140 is configured to play a role in compensating a distortion on a channel included in a signal. After compensating the distortion on the channel included in a demodulated signal, the equalizer 6140 outputs it to the block decoder 6160. The corresponding equalizer 6140 may be able to enhance equalizing performance by using a known data symbol sequence inputted from the known data sequence detector 6150. And, the equalizer 6140 may be able to enhance the equalizing performance in a manner of getting a decoding result of the block decoder 6160 as a feedback.

The known data sequence detector 6150 is configured to detect a known data location inserted by a transmitting side from a data of which a demodulation is not performed yet and/or a data of which a part of the demodulation is performed. The known data sequence detector 6150 outputs a location information based on the detected known data location and a known data sequence generated at the location together to the VSB demodulator 6130 and the equalizer 6140. And, in order for the block decoder 6160 to distinguish a mobile service data for a mobile broadcasting, which is went through an additional coding from the transmitting side, from a main service data for a conventional broadcasting, which is not went through the additional coding, the known data sequence detector 6150 may be able to output the corresponding information to the block decoder 6160.

In case that a data inputted after a channel equalization corresponds to the data of which both a block encoding and a trellis encoding are performed by the transmitting side (e.g., data within an RS frame, a signaling data), the block decoder 6160 is configured to perform a trellis decoding and a block decoding in an opposite direction of the transmitting side. If it is a data of which the block encoding is not performed and the trellis encoding is performed (e.g., a main service data), the block decoder is configured to perform the trellis decoding only.

The signaling decoder 6170 is configured to perform decoding on the signaling data of which both the block encoding and the trellis encoding are performed, which is inputted after the channel equalization.

The primary RS frame decoder 6180 is configured to receive an RS (Reed-Solomon) coded mobile service data and/or a CRC (Cyclic Redundancy Check) coded mobile service data only among the block decoded data. The primary RS frame decoder 6180 is configured to correct errors in an RS frame by performing an opposite process of an RS frame encoder of a transmitting system and then configured to form one RS frame by collecting a plurality of error-corrected data groups. The corresponding primary RS frame decoder 6180 is configured to decode a primary RS frame transmitted for a practical broadcasting service and the like.

The secondary RS frame decoder 6190 is configured to receive an RS (Reed-Solomon) coded mobile service data and/or a CRC (Cyclic Redundancy Check) coded mobile service data only among the block decoded data. The secondary RS frame decoder 6190 is configured to correct errors in the RS frame by performing an opposite process of the RS frame encoder of the transmitting system and then configured to form one RS frame by collecting a plurality of error-corrected data groups. The corresponding secondary RS frame decoder 6190 is configured to decode a secondary RS frame transmitted for a practical broadcasting service and the like.

The physical adaptation processor 6200 may be able to include a physical parameter handler 6210, a FIC (Fast channel Information) handler 6220, a physical adaptation control signal handler 6230, a primary RS frame handler 6240, a secondary RS frame handler 6250 and/or a mobile transport packet handler 6260.

The physical parameter handler 6210 is configured to receive and process a baseband information required by modules, which may be included in the physical adaptation processor 6200. The corresponding information is transmitted in a form of a TPC (transport parameter channel). Processing the FIC data, which is received from the baseband processor 6100, and the like can be performed using the corresponding information.

The FIC (Fast Channel Information) handler 6220 is configured to process the FIC data received from the base band processor 6100 in relation to the TPC data received from the physical parameter handler 6210.

The physical adaptation control signal handler 6230 is configured to collect the FIC data received from the FIC handler 6220 and SI (service information) data received via the RS frame and then configured to play a role in storing in the storage 6340 in a manner of configuring and processing IP datagram and access information of a mobile broadcast service from a physical signal.

The primary RS frame handler 6240 is configured to compose a mobile transport packet by dividing the primary RS frame delivered from the primary RS frame decoder 6180 of the base band processor 6100 into each row unit and configured to output the packet to the mobile transport packet handler 6260.

The secondary RS frame handler 6250 is configured to compose a mobile transport packet by dividing the secondary RS frame delivered from the secondary RS frame decoder 6190 of the base band processor 6100 into each row unit and configured to output the packet to the mobile transport packet handler 6260.

The mobile transport packet handler 6260 is configured to identify a data included in a corresponding mobile transport packet in a manner of extracting each header of the mobile transport packet delivered from the primary RS frame handler 6240/the secondary RS frame handler 6250. If the data corresponds to the SI data, which is a sort of physical adaptation data, the data is outputted to the physical adaptation control signal handler 6230. If the data corresponds to an IP datagram, the data is outputted to an IP network stack 6310.

The management processor 6300 may be able to include an IP network stack 6310, a file handler 6320, an ESG handler 6330, storage 6340, an ESG handler 6350, a streaming handler 6360, and/or an SI handler 6370.

The IP network stack 6310 is configured to process UDP, RTP, RTCP, ALC/LCT, FLUTE, and the like to process a broadcast data transmitted in a form of an IP datagram. If each data corresponds to a streaming data, the data is outputted to the streaming handler 6360. If each data corresponds to a data of a file form, the data is outputted to the file handler 6320.

The file handler 6320 is configured to configure a data delivered in a form of an object according to ALC/LCT and FLUTE structure as a file form in a manner of collecting the data. If a corresponding file includes an ESG (electronic service guide), the file handler outputs it to the ESG handler 6330. If the corresponding file corresponds to a data for a file based service except the ESG, the file handler outputs the data to the presentation processor 6400.

The ESG handler 6330 is configured to process ESG data and stores the ESG data in the storage 6340. Or, the ESG handler outputs the ESG data to the ESG decoder 6350 and uses the ESG data when a user makes a request for the data.

The storage 6340 is configured to play a role in storing a broadcast service information (system information) delivered from the physical adaptation control signal handler 6230 and/or the ESG handler 6330. The storage 6340 is configured to deliver a stored data when a user makes a request for the data.

The ESG decoder 6350 is configured to restore the ESG data stored in the storage 6340 or the ESG data delivered from the ESG handler 6330 and outputs the data to the presentation controller 6410 in a format capable of outputting to a user.

The streaming handler 6360 is configured to extract an A/V stream from the data delivered in a form according to RTP and RTCP structure and outputs the A/V stream to the A/V decoder 6440.

The SI handler 6370 is configured to process SI information transmitted on an SSC (service signaling channel). A mobile broadcasting receiver obtains information on a component stream configuring a service via an SMT (service map table). The information can be used after the information is stored in a memory or the storage 6340 or can be used in a manner of being delivered to such a different controller as the presentation controller 6410 or the like from the SI handler 6370. Meanwhile, the presentation controller 6410 may be able to display a media to a user in a manner of properly decoding and performing a post processing the media according to characteristics of various media components configuring a service.

The presentation processor 6400 may be able to include a presentation controller 6410, a channel service manager 6420, an application manager 6430, an A/V decoder 6440, a 3D format converter 6450 and/or a 3D display module 6460.

The presentation controller 6410 is configured to play a role in controlling modules outputting a data received from a mobile broadcasting system to a user.

The channel service manager 6420 is configured to perform a role of interface with a user in order for the user to use such a broadcast service transmitted based on a channel as a channel map management, a channel service access, and the like.

The application manager 6430 is configured to perform a role of interface with a user in order for the user to use an application service except an ESG display or other channel service.

The A/V decoder 6440 is configured to decode an audio and a video signal in a manner of restoring a data delivered from the streaming handler 6360 to fit to each format.

The 3D format converter 6450 is configured to perform a pixel mapping work to display a video signal (side-by-side or top-and-bottom) received from the A/V decoder 6440 in a 3D display. To this end, the 3D format converter receives format information on a video currently coded and to be outputted from the presentation controller 6410 (or the SI handler) and then determines a format conversion work mode.

The 3D display module 6460 is configured to display an audio and video signal restored by the A/V decoder 6440 to a user.

Figure 7:
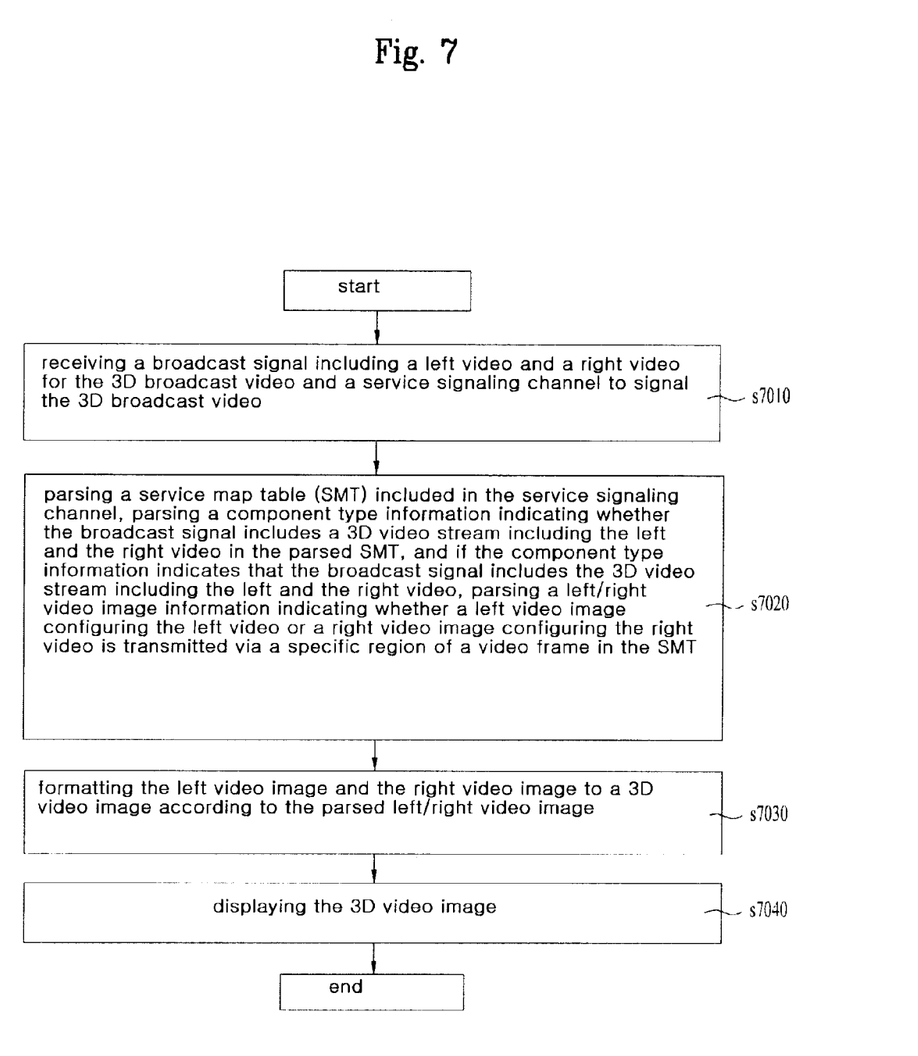
FIG. 7 is a flowchart indicating a method of receiving a 3D broadcast video according to one embodiment of the present invention.

FIG. 7 is a flowchart indicating a method of receiving a 3D broadcast video according to one embodiment of the present invention.

A mobile broadcasting receiver includes a left and right video for a 3D broadcast video and receives a broadcasting signal including a signaling channel to signal the 3D broadcast video [S7010].

The mobile broadcasting receiver parses a service map table (SMT) included in the service signaling channel, parses a component type information indicating whether the broadcasting signal includes a 3D video stream including the left and the right video in the parsed SMT, and if the component type information indicates that the broadcasting signal includes the 3D video stream including the left and the right video, parses a left/right video image information indicating whether a left video image configuring the left video or a right video image configuring the right video is transmitted via a specific region of a video frame in the SMT [S7020]. In this case, the mobile broadcasting receiver may further parse a 3D image direction information indicating whether at least one of the left video image and the right video image is transmitted in a manner of upside down in the video frame.

The mobile broadcasting receiver formats the left video image and the right video image as a 3D video image according to the parsed left/right video image information [S7030].

The mobile broadcasting receiver displays the 3D video image [S7040].

According to the aforementioned present invention, essential elements configuring a 3DTV signal are two video streams corresponding to the left video and the right video. One of the video streams can be signaled to have a compatibility with a 2D legacy device.

And, according to the present invention, in case that a video data of a different timing point is hard to be transmitted as a full resolution due to a bandwidth limitation, it may be able to transmit the video data as a half resolution for efficient compression and may be then able to efficiently transmit the information necessary to decode the video data.

And, according to the present invention, it may be able to transmit a signaling for a video data additionally transmitted for a 3D broadcasting service and information on a corresponding data using a PSI, PSIP, and/or DVB SI structure.

Moreover, a method of providing a 3D service of better quality provided by a receiver is provided by signaling a resolution information on an additional data (secondary video), a codec information, an information on a filtering technology recommended when a resizing is performed.

A method invention according to the present invention can be recorded in a computer readable media in a manner of being implemented in a program command form capable of being performed by various computer means. The computer readable media may be able to include a program command, a data file, a data structure, and the like separately or collectively. The program command recorded in the media may be specifically designed and configured for the present invention or may be usable in a manner of being publicized by those having ordinary skill in the computer software. The examples of the computer readable recording media may include such a hardware device specifically configured to perform/store the program command as a hard disk, floppy disk, a magnetic media like a magnetic tape, a CD-ROM, an optical media like a DVD, a magneto-optical media like a floptical disk, a ROM, a RAM, a flash memory and the like. The examples of the program command may include a high level language code implementable by a computer using an interpreter and the like as well as a machine code made by a compiler. The above-written hardware devices can be configured to operate by at least one software module to perform an operation of the present invention, and vice versa.

While the present invention has been described and illustrated herein with reference to the preferred embodiments and diagrams thereof, the present invention may be non-limited to the embodiments and it will be apparent to those skilled in the art that various modifications and variations can be made therein without departing from the spirit and scope of the invention. Thus, it is intended that the present invention covers the modifications and variations of this invention that come within the scope of the appended claims and their equivalents.

MODE FOR INVENTION

As mentioned in the foregoing description, the related is described in the best mode for invention.

INDUSTRIAL APPLICABILITY

As mentioned earlier, the present invention can be applied to a mobile broadcasting system receiving a 3D broadcast service.

What is claimed is:

1. A receiver for receiving a broadcast signal, comprising:
a tuner to receive the broadcast signal including a 3DTV broadcasting service including stereoscopic 3D video data, and a service map table (SMT) transmitted through a service signaling channel,
wherein the stereoscopic 3D video data includes a left video and a right video;
a system information handler to parse the SMT,
wherein the SMT includes 3D structure information indicating whether the 3D video data is based on a half resolution or a full resolution,
wherein the SMT further includes L/R first information indicating whether a left image is the left video or the right video when the 3D video data is a side-by-side format of the half resolution, or whether a top half image is the left video or the right video when the 3D video data is a top-bottom format of the half resolution,
wherein the SMT further includes 3D orientation information indicating whether or not at least one of the left video image or the right video image is flipped;
a 3D video formatter to format a 3D video image by mapping the left video image and the right video image based on the left/right video image information and the 3D orientation information; and
a 3D video display unit configured to display the 3D video image.

2. The receiver of claim 1, further comprising:
a known data sequence detector configured to detect a location of a known data sequence included in the received broadcast signal; and
a channel equalizer configured to perform a channel equalization on a channel on which the broadcast signal is transmitted by detecting the known data sequence included in the broadcast signal with the location of the detected known data sequence.

3. The receiver of claim 2, further comprising:
a trellis decoder configured to perform a trellis decoding for a data included in a broadcast signal received after the channel equalization is performed.

4. The receiver of claim 3, further comprising:
an RS frame decoder configured to perform an error correction decoding for the trellis decoded data in a Reed-Solomon (RS) frame unit.

5. A method for receiving a broadcast signal, comprising the steps of:
receiving the broadcast signal including a 3DTV broadcasting service including stereoscopic 3D video data, and a service map table (SMT) transmitted through a service signaling channel,
wherein the stereoscopic 3D video data includes a left video and a right video;
parsing the SMT,
wherein the SMT includes 3D structure information indicating whether the 3D video data is based on a half resolution or a full resolution,
wherein the SMT further includes L/R first information indicating whether a left image is the left video or the right video when the 3D video data is a side-by-side format of the half resolution, or whether a top half image is the left video or the right video when the 3D video data is a top-bottom format of the half resolution,
wherein the SMT further includes 3D orientation information indicating whether or not at least one of the left video image or the right video image is flipped;
formatting a 3D video image by mapping the left video image and the right video image based on the left/right video image information and the 3D orientation information; and
displaying the 3D video image.

6. The method of claim 5, further comprising the steps of:
detecting a location of a known data sequence included in the received broadcast signal; and
performing a channel equalization on a channel on which the broadcast signal is transmitted by detecting the known data sequence included in the broadcast signal with the location of the detected known data sequence.

7. The method of claim 6, further comprising the step of performing a trellis decoding for a data included in a broadcast signal received after the channel equalization is performed.

8. The method of claim 7, further comprising the step of performing an error correction decoding for the trellis decoded data in a Reed-Solomon (RS) frame unit.

* * * * *